United States Patent
Noto et al.

(10) Patent No.: US 9,641,595 B2
(45) Date of Patent: May 2, 2017

(54) SYSTEM MANAGEMENT APPARATUS, SYSTEM MANAGEMENT METHOD, AND STORAGE MEDIUM

(71) Applicant: FUJITSU LIMITED, Kawasaki-shi, Kanagawa (JP)

(72) Inventors: Kazufumi Noto, Kawasaki (JP); Takuya Yamada, Sagamihara (JP); Koji Nakazono, Yokohama (JP); Takamitsu Iriumi, Yokohama (JP); Toru Atsumi, Nakano (JP); Ryuji Satomoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 243 days.

(21) Appl. No.: 13/900,698

(22) Filed: May 23, 2013

(65) Prior Publication Data
US 2014/0006554 A1 Jan. 2, 2014

(30) Foreign Application Priority Data

Jul. 2, 2012 (JP) ................................. 2012-148785

(51) Int. Cl.
*H04L 29/08* (2006.01)
*H04L 12/24* (2006.01)
*G06F 9/50* (2006.01)
*G06F 9/455* (2006.01)

(52) U.S. Cl.
CPC .............. *H04L 67/10* (2013.01); *H04L 41/12* (2013.01); *G06F 9/505* (2013.01); *G06F 2009/45575* (2013.01)

(58) Field of Classification Search
None
See application file for complete search history.

(56) References Cited

U.S. PATENT DOCUMENTS

| 6,681,242 | B1 | 1/2004 | Kumar et al. | |
| 7,962,644 | B1* | 6/2011 | Ezerzer | H04M 3/5191 370/352 |
| 8,103,769 | B1* | 1/2012 | Weiser | G06F 9/5011 709/225 |
| 2006/0271677 | A1* | 11/2006 | Mercier | G06F 17/30197 709/224 |

(Continued)

FOREIGN PATENT DOCUMENTS

| WO | WO 2006/043321 A1 | 4/2006 |
| WO | WO 2009/011063 A1 | 1/2009 |

OTHER PUBLICATIONS

German Office Action dated Aug. 12, 2016 in corresponding German Patent Application No. 10 2013 209 934.7.

*Primary Examiner* — Ranodhi Serrao
*Assistant Examiner* — James Fiorillo
(74) *Attorney, Agent, or Firm* — Staas & Halsey LLP

(57) ABSTRACT

A system management apparatus includes a processor configured to function as a collecting unit that collects communication records of functional components to be managed; an extracting unit that extracts communication links between the functional components from the collected communication records; a closed-path eliminating unit that removes one or more of the communication links to eliminate closed paths from the communication links; and an order determining unit that determines an order in which the functional components are started or stopped based on the communication links from which the closed paths have been eliminated.

14 Claims, 22 Drawing Sheets

(56) References Cited

U.S. PATENT DOCUMENTS

| | | | |
|---|---|---|---|
| 2007/0100957 A1* | 5/2007 | Bhogal | G06F 8/65 709/217 |
| 2007/0198692 A1 | 8/2007 | Mimura et al. | |
| 2007/0245004 A1* | 10/2007 | Chess | H04L 41/145 709/223 |
| 2008/0267179 A1* | 10/2008 | LaVigne | H04L 12/66 370/389 |
| 2010/0106776 A1 | 4/2010 | Iwakura et al. | |
| 2010/0228819 A1* | 9/2010 | Wei | G06F 9/505 709/203 |
| 2010/0318639 A1* | 12/2010 | Jauquet | G06F 9/485 709/223 |
| 2010/0325287 A1* | 12/2010 | Jagadeeswaran | H04L 67/02 709/227 |
| 2011/0314145 A1* | 12/2011 | Raleigh | H04L 41/0893 709/224 |
| 2012/0179846 A1* | 7/2012 | Haustein | G06F 3/061 710/38 |
| 2012/0226804 A1* | 9/2012 | Raja | H04L 43/028 709/224 |
| 2013/0086227 A1* | 4/2013 | Takao | H04L 67/00 709/219 |
| 2013/0132545 A1* | 5/2013 | Schultze | H04L 41/00 709/223 |
| 2013/0282887 A1* | 10/2013 | Terayama | G06F 9/45533 709/223 |
| 2013/0332590 A1* | 12/2013 | Mohaban | G06Q 10/10 709/223 |
| 2014/0086254 A1* | 3/2014 | Hardie | H04L 45/60 370/400 |
| 2014/0149490 A1* | 5/2014 | Luxenberg | G06F 15/00 709/203 |
| 2014/0164587 A1* | 6/2014 | Kitajima | H04L 63/02 709/223 |
| 2014/0304352 A1* | 10/2014 | Chaudhary | H04L 67/1029 709/208 |
| 2014/0304407 A1* | 10/2014 | Moon | H04L 43/045 709/224 |

* cited by examiner

FIG.5

|      | LOCAL ADDRESS          | FOREIGN ADDRESS       |
|------|------------------------|-----------------------|
| (1)  | 127.0.0.1:13321        | 127.0.0.1:46646       |
| (2)  | 127.0.0.1:8013         | 127.0.0.1:33590       |
| (3)  | 127.0.0.1:23465        | 127.0.0.1:51224       |
| (4)  | 127.0.0.1:58390        | 127.0.0.1:23464       |
| (5)  | 127.0.0.1:58379        | 127.0.0.1:23464       |
| (6)  | 127.0.0.1:58454        | 127.0.0.1:23464       |
| (7)  | 10.124.165.209:23461   | 10.33.186.157:50037   |
| (8)  | 10.124.165.209:23461   | 10.33.186.157:50036   |
| (9)  | 10.124.165.209:23461   | 10.33.186.157:50033   |
| (10) | 10.124.165.209:23461   | 10.33.186.157:50032   |
| (11) | 10.124.165.209:23461   | 10.33.186.157:50034   |
| (12) | 10.124.165.209:3501    | 10.33.186.157:49970   |
| (13) | 10.124.165.209:3501    | 10.33.186.157:49969   |
| (14) | 10.124.165.209:23461   | 10.33.186.157:50031   |
| (15) | 10.124.165.209:3501    | 10.33.186.157:49983   |
| (16) | 10.124.165.209:3501    | 10.33.186.157:49988   |
| (17) | 10.124.165.209:3501    | 10.33.186.157:49999   |
| (18) | 10.124.165.209:3501    | 10.33.186.157:49998   |
| (19) | 10.124.165.209:50025   | 10.25.190.160:80      |
| (20) | 10.124.165.209:50028   | 10.25.190.160:80      |
| (21) | 10.124.165.209:50033   | 10.25.190.160:80      |
| (22) | 10.124.165.209:50035   | 10.25.190.160:80      |

- COMMUNICATION RECORD RECEIVING UNIT — 152
- COMMUNICATION LINK EXTRACTING UNIT — 154
- CLOSED-PATH ELIMINATING UNIT — 156
- ORDER DETERMINING UNIT — 158
- STARTING AND STOPPING UNIT — 160

SYSTEM MANAGEMENT APPARATUS, SYSTEM MANAGEMENT METHOD, AND STORAGE MEDIUM

CROSS-REFERENCE TO RELATED APPLICATION

This application is based upon and claims the benefit of priority of Japanese Patent Application No. 2012-148785 filed on Jul. 2, 2012, the entire contents of which are incorporated herein by reference.

FIELD

The embodiments discussed herein are related to a system management apparatus, a system management method, and a storage medium.

BACKGROUND

In a server apparatus including multiple functional components such as a Web server, an application server, and a database server, there are cases where a group of functional components need to be started or stopped. Here, when dependency exists between processes performed by the functional components to be started or stopped, it is necessary to start or stop the functional components in an appropriate order. If the functional components are started or stopped in an inappropriate order, problems may occur. For example, an unexpected error message may be output to a monitor or the started functional components may not function normally.

There exists an application management program for managing a system where multiple applications installed in separate server computers collaborate with each other to provide a service (see, for example, WO 2006/043321). The application management program selects the server computers whose applications are to be started or stopped according to an order of starting applications which is predefined based on the dependency of processes. For example, the application management program requests a Web server, an application server, and a database server in the order mentioned to stop their applications.

There also exists a communication message sorting program that extracts sender and destination addresses and sender and destination port numbers from communication messages to identify highly-correlated server apparatuses and identifies a system composed of the server apparatuses as a multilevel system (see, for example, WO 2009/011063).

SUMMARY

According to an aspect of the embodiments of the invention, there is provided a system management apparatus including a processor configured to function as a collecting unit that collects communication records of functional components to be managed; an extracting unit that extracts communication links between the functional components from the collected communication records; a closed-path eliminating unit that removes one or more of the communication links to eliminate closed paths from the communication links; and an order determining unit that determines an order in which the functional components are started or stopped based on the communication links from which the closed paths have been eliminated.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a drawing illustrating exemplary communication records of a virtual server;

FIG. 6 is a drawing illustrating an exemplary functional configuration of a start/stop control unit;

DESCRIPTION OF EMBODIMENTS

With the related-art application management program described above, it is necessary to define the order of starting applications in advance. Accordingly, with the related-art technology, it is not possible to start or stop multiple functional components in an appropriate order when the dependency between processes is unknown.

The related-art communication message sorting program described above identifies a system as a multilevel system and therefore can identify the dependency between processes to some extent. However, the related-art communication message sorting program is not applicable to a system having a complex network configuration. For example, the related-art communication message sorting program is not applicable to a system whose communication links include closed paths.

An aspect of this disclosure makes it possible to start or stop multiple functional components in an appropriate order even when communication links among the functional components are complex.

Embodiments of the present invention are described below with reference to the accompanying drawings.

EMBODIMENTS

Figure 1:
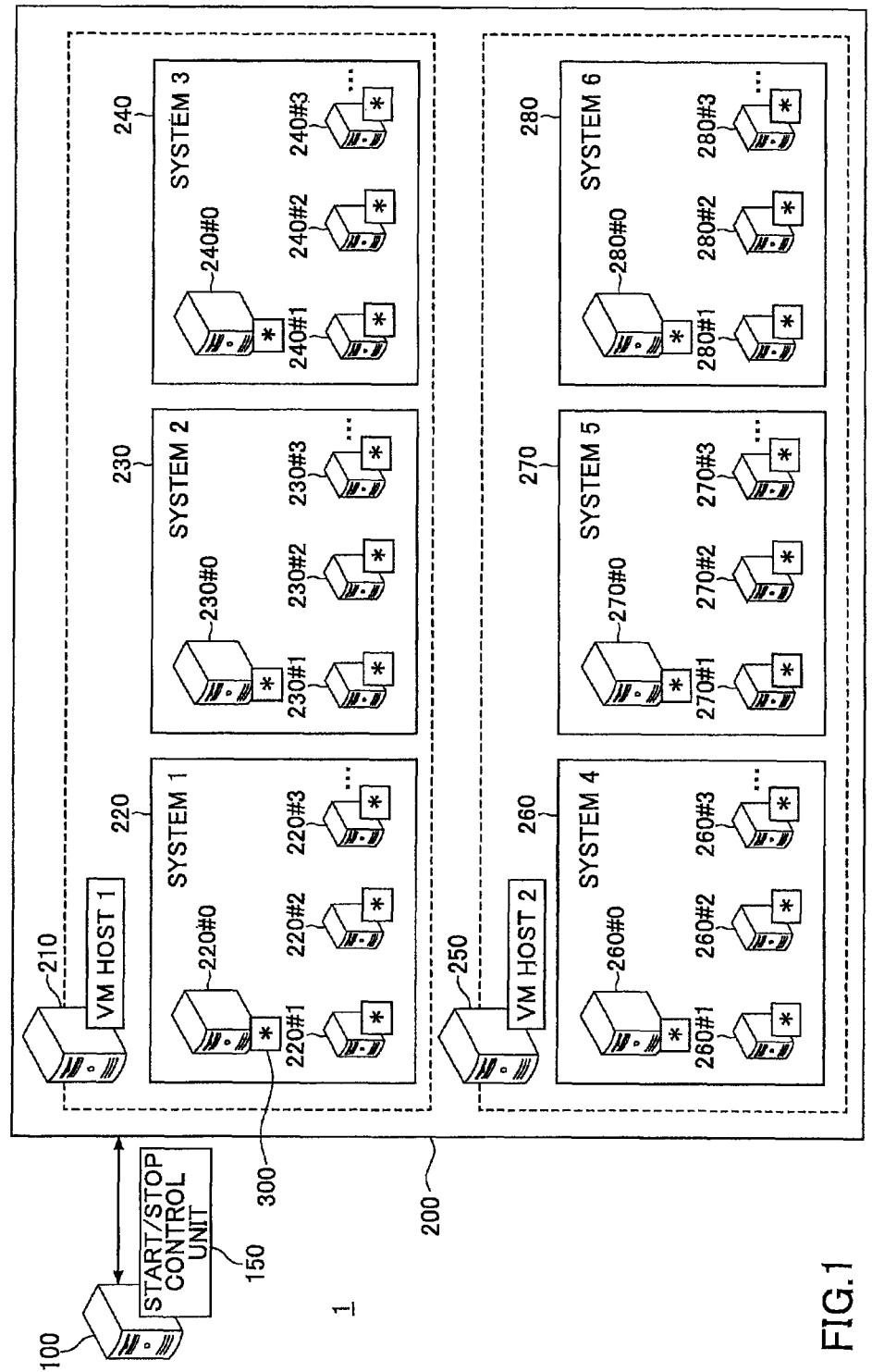
FIG. 1 is a drawing illustrating an exemplary configuration of a server system according to an embodiment.

A system management apparatus, a system management method, and a storage medium storing a system management program according to embodiments of the present invention are described below.
<System Configuration>
FIG. 1 is a drawing illustrating an exemplary configuration of a server system 1. The server system 1 may include a management server 100 and a managed server 200.

The management server 100 is connected to the managed server 200 for communications and includes a start/stop control unit 150 that controls a process for starting and stopping, for example, virtual servers running on the managed server 200. Details of the start/stop control unit 150 are described later.

The managed server 200 provides, for example, a cloud service. In the example of FIG. 1, a virtual machine (VM) host 210 and a VM host 250 run on the managed server 200. The VM host 210 controls a system 1 (220), a system 2 (230), and a system 3 (240); and the VM host 250 controls a system 4 (260), a system 5 (270), and a system 6 (280).

The system 1 (220) may include virtual servers 220#0, 220#1, 220#2, 220#3, and so on. The system 2 (230) may include virtual servers 230#0, 230#1, 230#2, 230#3, and so on. The system 3 (240) may include virtual servers 240#0, 240#1, 240#2, 240#3, and so on. The system 4 (260) may include virtual servers 260#0, 260#1, 260#2, 260#3, and so on. The system 5 (270) may include virtual servers 270#0, 270#1, 270#2, 270#3, and so on. The system 6 (280) may include virtual servers 280#0, 280#1, 280#2, 280#3, and so on.

For example, the virtual servers may include an operating system (OS) and middleware, and function as a Web server, an application server, and a database server for providing a cloud service.

Communication records of the virtual servers are collected by corresponding communication monitoring agents 300 (indicated by "*" in FIG. 1). The communication records of the virtual servers collected by the communication monitoring agents 300 are sent to the management server 100.

Figure 2:
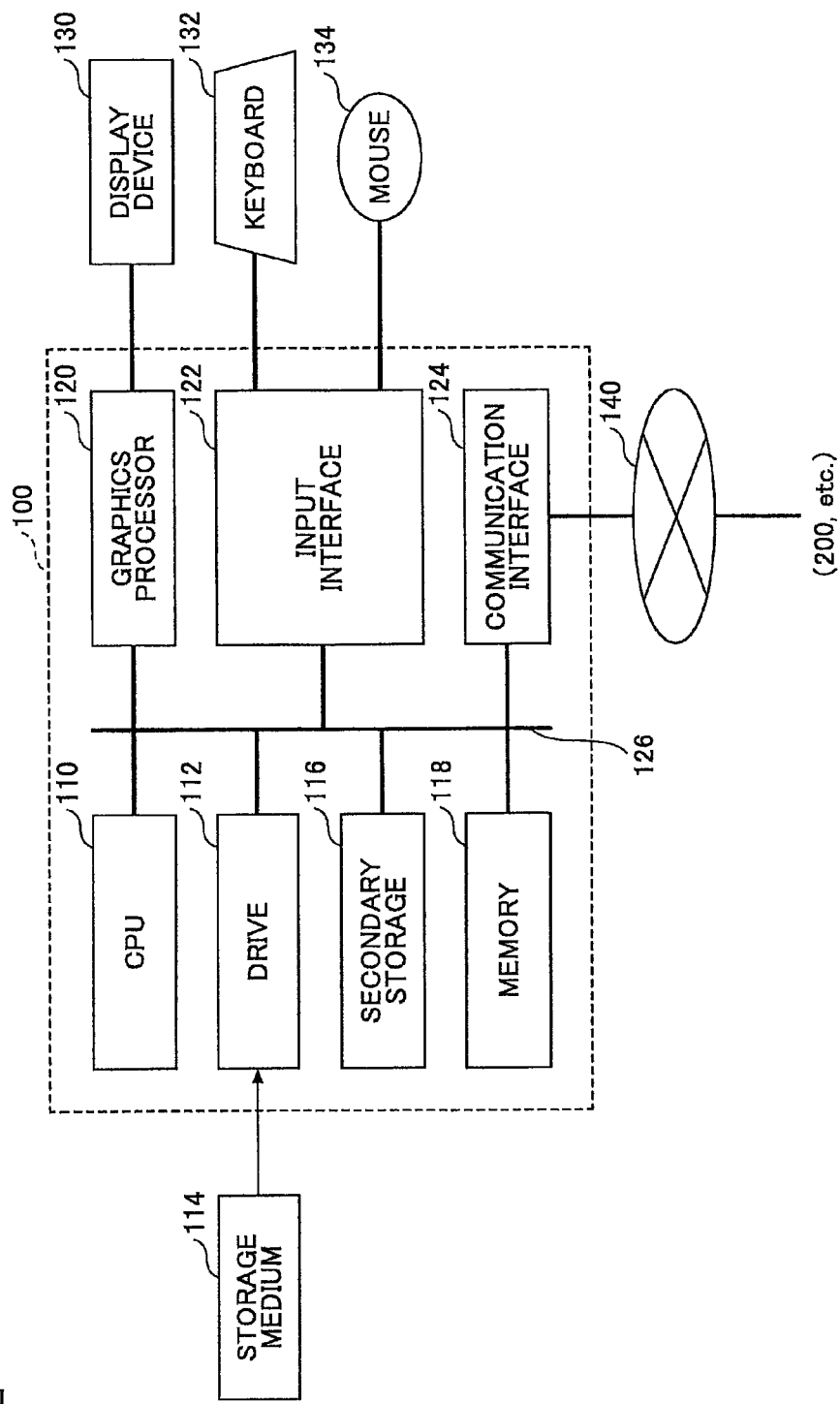
FIG. 2 is a block diagram illustrating an exemplary hardware configuration of a management server.

FIG. 2 is a block diagram illustrating an exemplary hardware configuration of the management server 100. The management server 100 may include a central processing unit (CPU) 110, a drive 112, a secondary storage 116, a memory 118, a graphics processor 120, an input interface 122, and a communication interface 124 that are connected to each other via, for example, a bus 126.

The CPU 110 is a processor and may include, for example, a program counter, an instruction decoder, computing units, a load store unit (LSU), and a general register.

The drive 112 reads programs and data from a storage medium 114. When the storage medium 114 storing programs is mounted on the drive 12, the programs are read by the drive 112 from the storage medium 114 and are installed in the secondary storage 116. The storage medium 114 is implemented by, for example, a portable storage medium such as a compact disk (CD), a digital versatile disk (DVD), or a Universal Serial Bus (USB) memory. The secondary storage 116 is implemented by, for example, a hard disk drive (HDD) or a flash memory.

Programs may be installed from the storage medium 114 into the secondary storage 116. Also, programs may be downloaded from another computer via a network 140 and the communication interface 124 and installed into the secondary storage 116. The network 140 is, for example, the Internet, a local area network (LAN), or a wireless network. Further, programs may be stored in the secondary storage 116 and/or a read-only memory (ROM) before the shipment of the management server 100.

The CPU 110 executes the installed or stored programs to cause an information processing apparatus configured as illustrated by FIG. 2 to function as the management server 100 of the present embodiment.

The memory 118 may be implemented, for example, by a random access memory (RAM) and an electrically erasable and programmable read-only memory (EEPROM).

The graphics processor 120 is connected to the display device 130 and generates screens to be displayed by the display device 130. Peripheral devices such as a keyboard 132 and a mouse 134 are connected to the input interface 122. The communication interface 124 controls communications performed between the management server 100 and other apparatuses including the managed server 200.

The managed server 200 may have a hardware configuration similar to or partially different from the hardware configuration of the management server 100 illustrated by FIG. 2.

Figure 3:
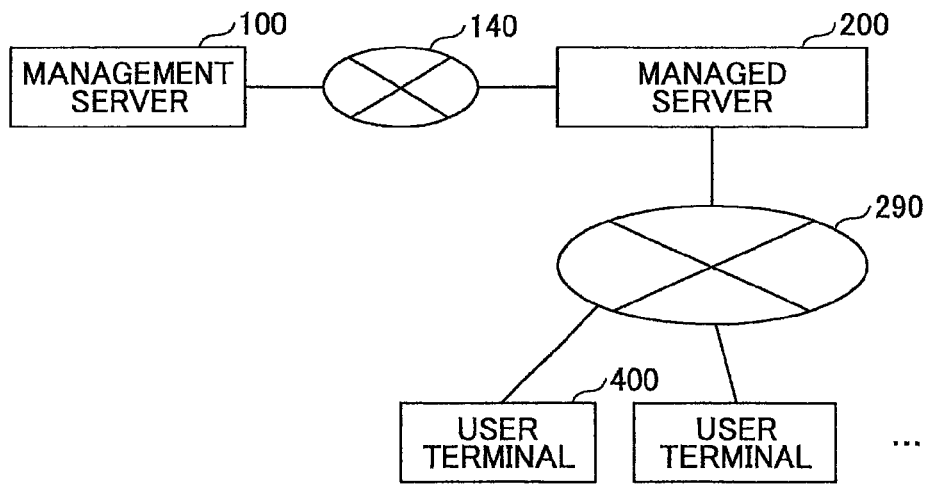
FIG. 3 is a drawing illustrating exemplary network connections of a management server and a managed server.

FIG. 3 is a drawing illustrating exemplary network connections of the management server 100 and the managed server 200. As illustrated in FIG. 3, the management server 100 and the managed server 200 are connected to each other via the network 140, and the managed server 200 is connected via a network 290 such as the Internet to multiple user terminals 400.

Here, the communication monitoring agents 300 may be collectively referred to as a "collecting unit", and the management server and the communication monitoring agents 300 may be collectively referred to as a "system management apparatus". The virtual servers may be referred to as "functional components". FIG. 1 illustrates just an exemplary configuration of a system where multiple functional components are managed by a system management apparatus; and variations, replacements, and deletions may be made to the configurations of the server system 1, the management server 100, and the managed server 200. For example, the management server 100 may be implemented as a software function of the managed server 200, and functional components may be implemented by hardware components.
<Communication Records>
The communication monitoring agents 300 monitor communications performed by the virtual servers, thereby collect communication records (or communication history) of the virtual servers, and send the communication records to the management server 100.

Figure 4:
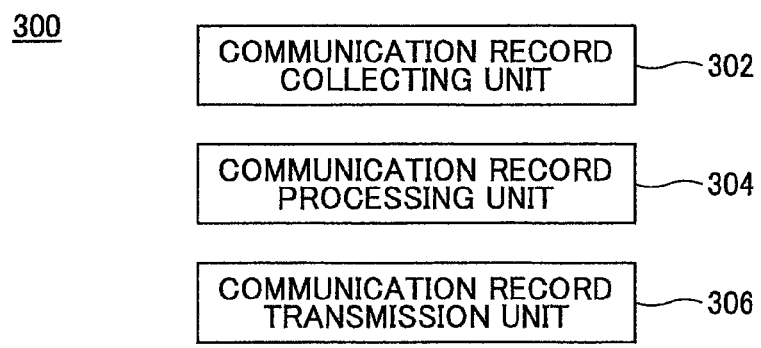
FIG. 4 is a drawing illustrating an exemplary functional configuration of a communication monitoring agent.

FIG. 4 is a drawing illustrating an exemplary functional configuration of the communication monitoring agent 300. The communication monitoring agent 300 is implemented by executing a program(s) by the CPU of the managed server 200, and may include functional blocks such as a communication record collecting unit 302, a communication record processing unit 304, and a communication record transmission unit 306. These functional blocks may not necessarily be implemented by separate programs. Instead, the functional blocks may be provided as subroutines or functions that are called by another program.

The communication record collecting unit 302 captures packets sent and received by the "local" virtual server (which is being monitored by the communication monitoring agent 300), and obtains IP addresses and port numbers from the packets. Based on the IP addresses and the port numbers obtained by the communication record collecting unit 302, the communication record processing unit 304 generates table data (communication records) where local IP addresses and port numbers of the local virtual server are associated with foreign IP addresses and port numbers of "foreign" virtual servers that communicated with the local virtual server.

FIG. 5 is a drawing illustrating exemplary communication records of a virtual server generated by the communication record processing unit 304. Each communication record of a virtual server includes a local IP address and a local port number (indicated by "LOCAL ADDRESS" in FIG. 5) of the local virtual server and a foreign IP address and a foreign port number (indicated by "FOREIGN ADDRESS" in FIG. 5) of a foreign virtual server (i.e., a destination or a sender of a packet).

In each communication record (row) of FIG. 5, numerals placed after a colon ":" indicate a port number and numerals placed before the colon indicate an IP address. In communication records (1) through (6), all IP addresses are represented by "127.0.0.1" that is a loopback address. Accordingly, communication records (1) through (6) indicate communications where the local virtual server is both a destination and a sender.

In communication records (7) through (18), the same local port numbers "23461" and "3501" are used repeatedly, which indicates that the local virtual server is the receiver in these communications. This can be said because the port number of a receiving virtual server is fixed to wait for connections. Meanwhile, the port number of a sending virtual server is selected sequentially from port numbers that are within a predefined range and currently not in use. Therefore, in communication records (7) through (18), various foreign port numbers are used.

In communication records (19) through (22), various local port numbers are used, which indicates that the local virtual server is the sender.

In the present embodiment, even when transmission and reception are performed multiple times in a communication session for a given purpose, the communication monitoring agent 300 records the communication session as one communication record, as if communication is performed once in one communication direction (which is represented by the initial communication direction).

<Start/Stop Control Unit>

The start/stop control unit 150 is described below. FIG. 6 is a drawing illustrating an exemplary functional configuration of the start/stop control unit 150. The start/stop control unit 150 is implemented by executing a program(s) by the CPU 110, and may include functional blocks such as a communication record receiving unit 152, a communication link extracting unit 154, a closed-path eliminating unit 156, an order determining unit 158, and a starting and stopping unit 160. These functional blocks may not necessarily be implemented by separate programs. Instead, the functional blocks may be provided as subroutines or functions that are called by another program.

Figure 7:
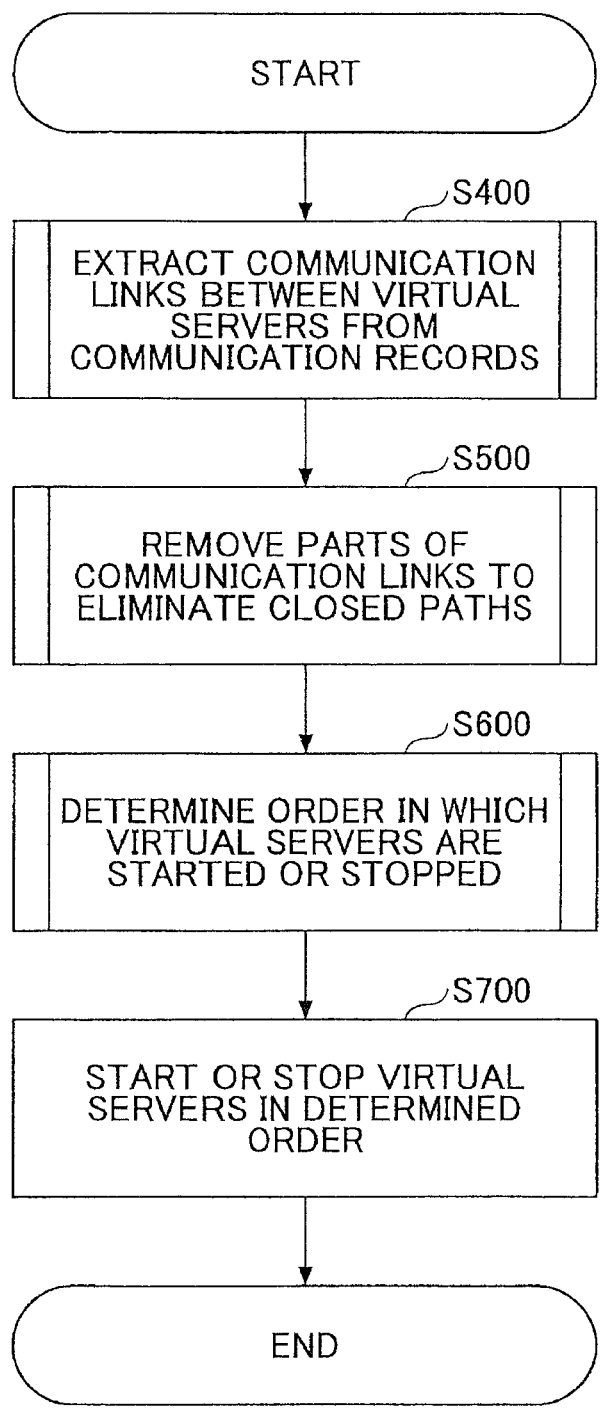
FIG. 7 is a flowchart illustrating an exemplary process performed by a start/stop control unit.

FIG. 7 is a flowchart illustrating an exemplary process performed by the start/stop control unit 150. The process of FIG. 7 is started, for example, when it becomes necessary to start or stop some or all of the virtual servers of the managed server 200 by the management server 100.

For example, when an administrator (or user) enters a command to the management server 100 for maintenance of the virtual servers, the management server 100 starts or stops the virtual servers of the managed server 200.

In FIG. 7, the communication link extracting unit 154 extracts communication links between the virtual servers from communication records received by the communication record receiving unit 152 (S400).

Next, the closed-path eliminating unit 156 removes a part of the communication links extracted by the communication link extracting unit 154 to eliminate closed paths from the communication links (so that no closed path exists in the communication links) (S500).

Next, based on the communication links from which closed paths have been eliminated by the closed path eliminating unit 156, the order determining unit 158 determines the order in which the virtual servers of the managed server 200 are started or stopped (S600).

Then, according to the order determined by the order determining unit 158, the starting and stopping unit 160 starts or stops the virtual servers of the managed server 200 (S700).

Steps in FIG. 7 are not necessarily performed in succession. For example, steps S400 through S600 may be performed first at desired timing, and step S406 may be performed separately at different timing when it becomes necessary to start or stop the virtual servers.

Details of steps in the process of FIG. 7 are described below.

<Extraction of Communication Links>

Figure 8:
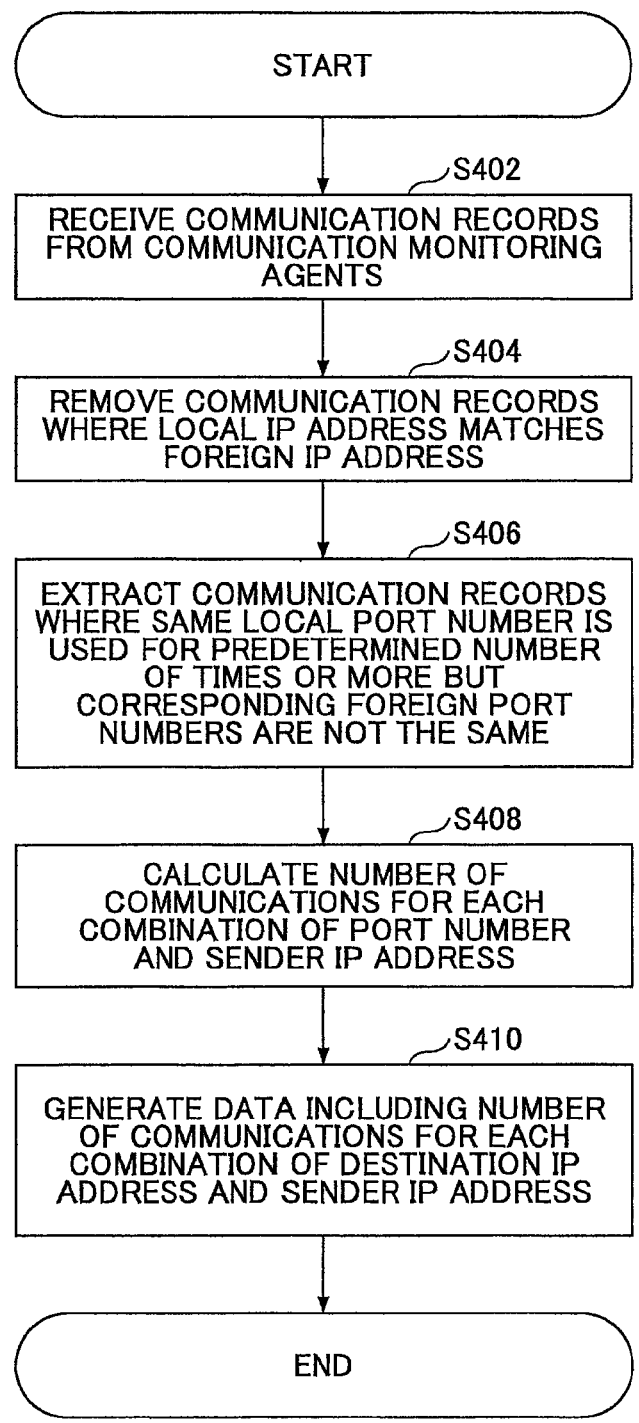
FIG. 8 is a flowchart illustrating an exemplary process performed by a communication record receiving unit and a communication link extracting unit.

FIG. 8 is a flowchart illustrating an exemplary process (step S400 of FIG. 7) performed by the communication record receiving unit 152 and the communication link extracting unit 154.

The communication record receiving unit 152 receives communication records from the communication monitoring agents 300 (S402).

Next, the communication link extracting unit 154 removes communication records in each of which the local IP address matches the foreign IP address from the received communication records (S404).

Next, the communication link extracting unit 154 extracts, from the communication records remaining after step S404, communication records where the same local port number is used for a first predetermined number of times or more but the corresponding foreign port numbers are not the same (e.g., each of the corresponding foreign port numbers is used less than a second predetermined number of times) (S406). In other words, the communication link extracting unit 154 determines, for each communication record, whether the local virtual server is the receiver or the sender based on the characteristics of communication records (e.g., the frequency of use or the degree of concentration of port numbers in the communication records) as described with reference to FIG. 5.

Through step S406, the communication link extracting unit 154 can extract communication records where the local virtual server is the destination (or receiver) from one of two identical sets of communication records collected at the sending virtual server and the receiving virtual server. Here, the first predetermined number of times and the second predetermined number of times may be different from each other.

Next, the communication link extracting unit 154 calculates the number of communications for each combination of a port number and a sender IP address (in this example, the IP address of a foreign virtual server that is a sender) (S408). Through step S408, the communication link extracting unit 154 generates data where the numbers of communications are associated with combinations of destination port numbers and sender IP addresses.

Then, the communication link extracting unit 154 totals the numbers of communications, which are associated with different destination port numbers, for each sender IP address and thereby generates data (graphical data) where the total number of communications is associated with each combination of a destination (or receiver) IP address and a sender IP address (S410).

Figure 9:
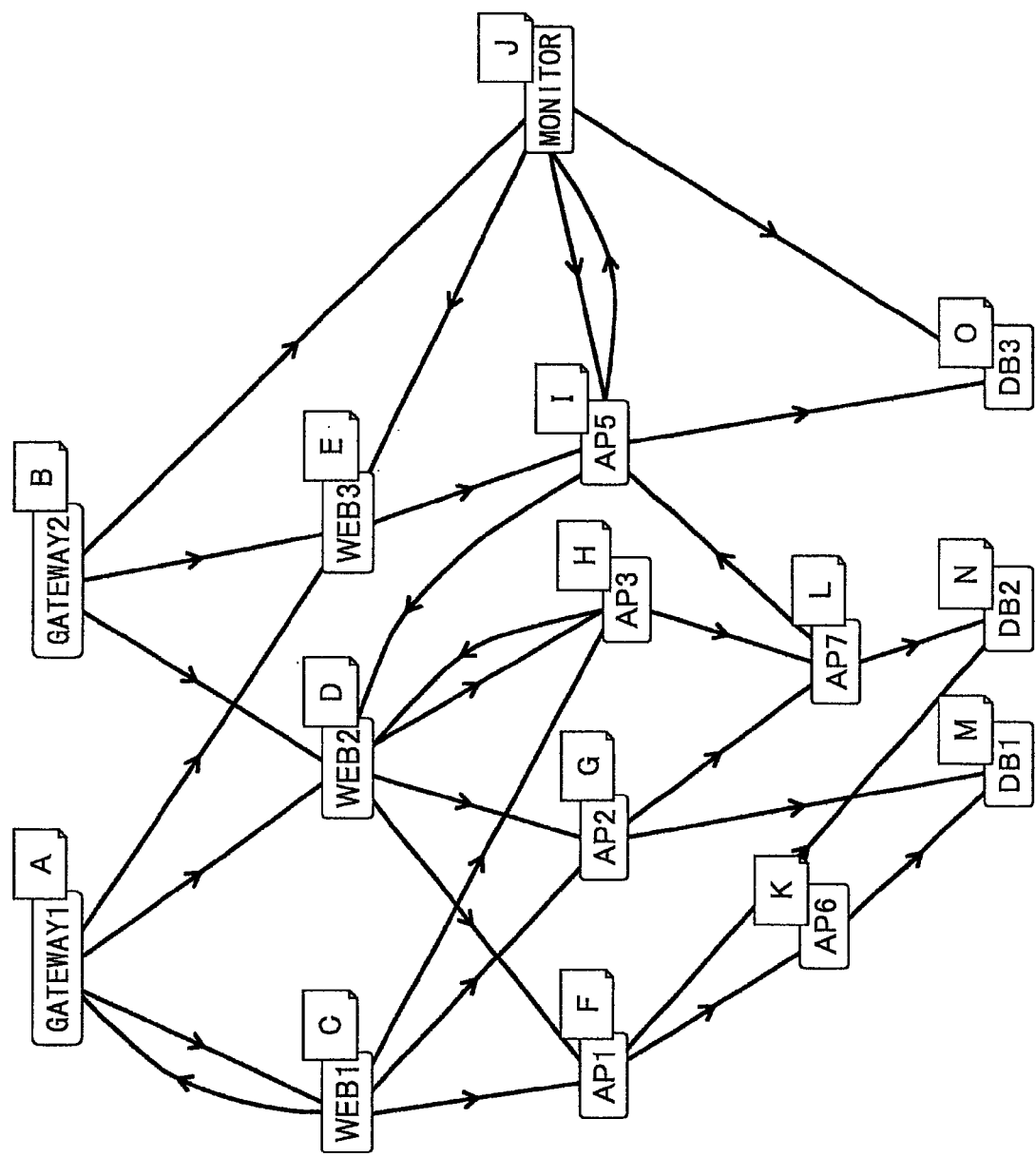
FIG. 9 is a schematic diagram illustrating exemplary graphical data generated by a communication link extracting unit.

FIG. 9 is a schematic diagram illustrating exemplary graphical data generated by the communication link extracting unit 154. In FIG. 9, labels "MONITOR", "GATEWAY", "WEB", "AP", AND "DB" indicate virtual servers running on the managed server 200 and represent their functions. In other words, the labels indicate communication entities (nodes) that perform communications in the managed server 200. "MONITOR" indicates a virtual server including a function for monitoring the status of other virtual servers. "GATEWAY" indicates a virtual server that, for example, includes a protocol conversion function and transfers data received from a user of a cloud service to other virtual servers. "WEB" indicates a virtual server that functions as a Web server. "AP" indicates a virtual server that functions as an application server. "DB" indicates a virtual server that functions as a database server.

As illustrated in FIG. 9, characters A through O are assigned to the respective virtual servers or communication entities (nodes). Arrows in FIG. 9 indicate communication directions. Further, although not illustrated in FIG. 9, it is assumed that information indicating the number of communications is attached to each arrow.

<Elimination of Closed Path>

The closed-path eliminating unit 156 identifies closed paths in the graphical data generated by the communication link extracting unit 154 and removes one or more links to eliminate the closed paths. In the descriptions below, communication entities are simply referred to as "nodes"; and arrows, which indicate communications between nodes, directions of the communications, and the numbers of communications, are referred to as "links".

A closed path indicates a looped communication path that leads from a first node to a second node and then back to the first node. When a closed path exists between nodes, it is not possible to determine the primary communication direction between the nodes and therefore it is not possible to automatically determine an appropriate starting or stopping order.

Figure 10:
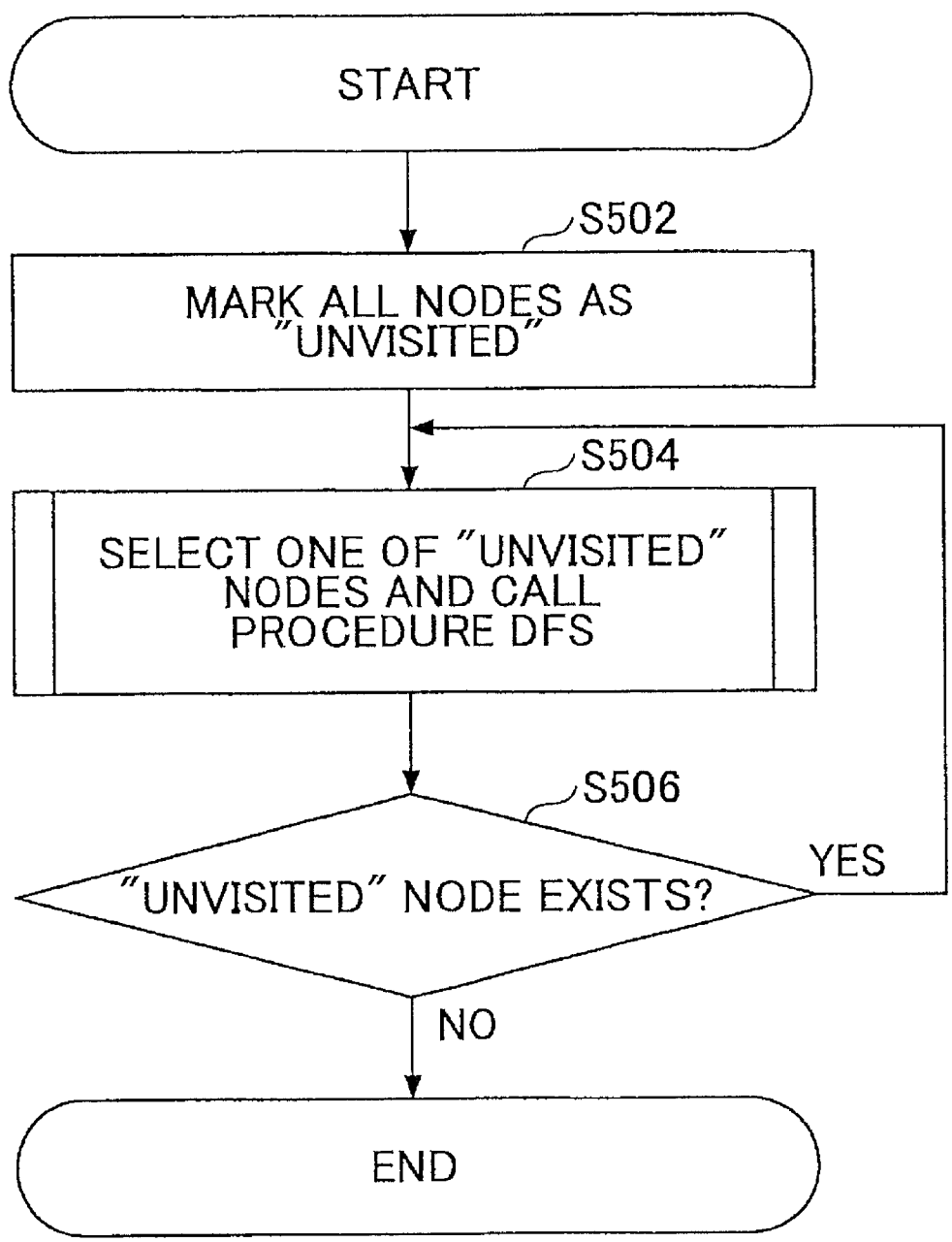
FIG. 10 is a flowchart illustrating an exemplary process performed by a closed-path eliminating unit.
Figure 11:
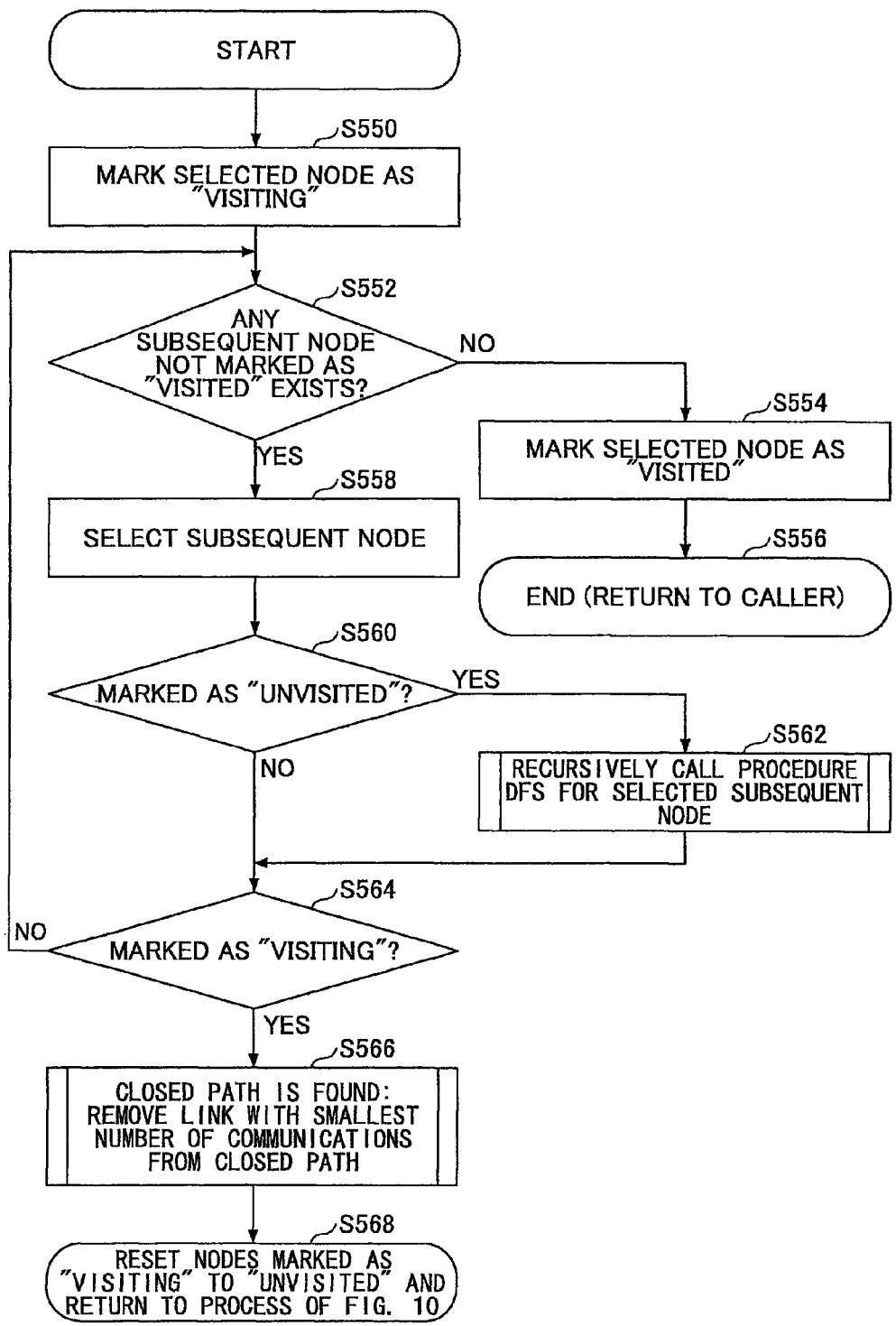
FIG. 11 is a flowchart illustrating an exemplary process performed by a closed-path eliminating unit.

FIGS. 10 and 11 are flowcharts illustrating an exemplary process (step S500 of FIG. 7) performed by the closed-path eliminating unit 156.

The closed-path eliminating unit 156 marks all nodes as "unvisited" (S502).

Next, the closed-path eliminating unit 156 selects one of the nodes ("unvisited" nodes) marked as "unvisited" and calls a procedure Depth First Search (DFS) (a subroutine that performs a process of FIG. 11) (S504).

After the procedure DFS is completed, the closed-path eliminating unit 156 determines whether any "unvisited" node still exists (S506). When an "unvisited" node exists (YES at S506), the process returns to step S504. Meanwhile, when no "unvisited" node exists (NO at S506), the process is terminated.

An exemplary process of the procedure DFS is described below with reference to FIG. 11. When the procedure DFS is called, the closed-path eliminating unit 156 marks the selected node (or current node) as "visiting" (S550).

Next, the closed-path eliminating unit 156 determines whether any subsequent node not marked as "visited" exists (S552). In other words, the closed-path eliminating unit 156 determines whether there is any subsequent node that has not been traced (or visited) yet. Here, when it is assumed that the selected node is a sender, a "subsequent node" is a destination of communications from the selected node. When multiple subsequent nodes exist, one of them may be selected at random.

When no subsequent node not marked as "visited" exists, the closed-path eliminating unit 156 marks the selected node as "visited" (S554) and returns to the calling point (S556).

Meanwhile, when a subsequent node not marked as "visited" exists, the closed-path eliminating unit 156 selects the subsequent node (S558).

Next, the closed-path eliminating unit 156 determines whether the selected subsequent node is marked as "unvisited" (S560).

When the selected subsequent node is marked as "unvisited", the closed-path eliminating unit 156 recursively calls the procedure DFS for the selected subsequent node (S562). That is, the closed-path eliminating unit 156 searches for nodes connected to the selected subsequent node.

Next, the closed-path eliminating unit 156 determines whether the selected subsequent node is marked as "visiting" (S564).

When the selected subsequent node is marked as "visiting", the closed-path eliminating unit 156 identifies a closed path formed by links between the selected node and the selected subsequent node that are marked as "visiting", and removes one of the links (forming the closed path) which has the smallest number of communications (or the smallest communication frequency) from the graphical data (S566).

Then, the closed-path eliminating unit 156 resets all nodes marked as "visiting" to "unvisited" and exits the procedure DFS to return to the subroutine of FIG. 10 (S568). This is because the state of the graph changes as a result of removing a closed path.

Through the process described above, one or more of the links in the graphical data generated by the communication link extracting unit 154 are removed to eliminate closed paths. In other words, the above process makes it possible to obtain graphical data that includes no closed path, i.e., that is suitable to determine the order of starting or stopping virtual servers of the managed server 200.

Figure 12:
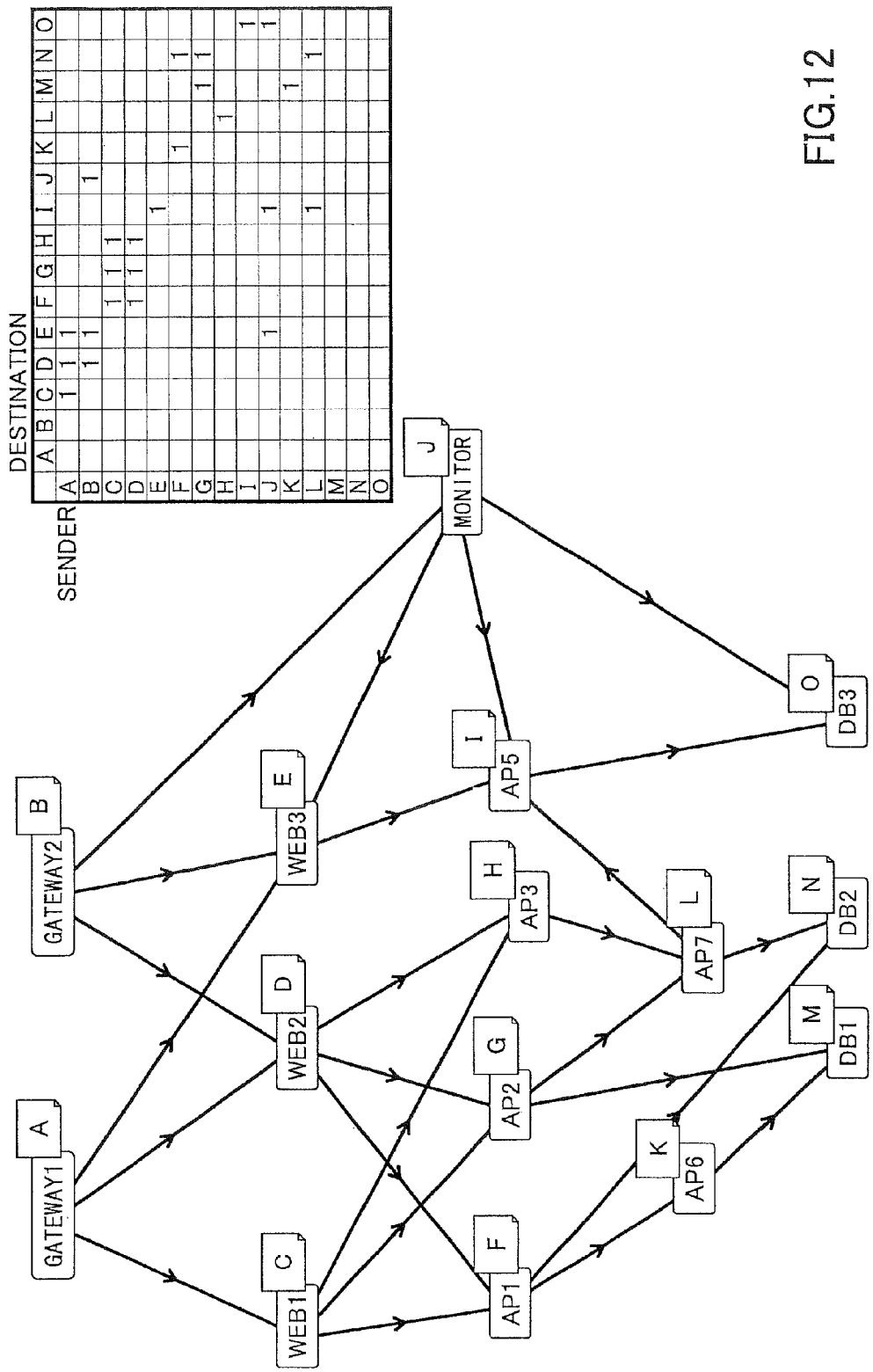
FIG. 12 is a drawing illustrating graphical data from which closed paths have been eliminated and table data containing values representing the graphical data.

FIG. 12 is a drawing illustrating closed-path-eliminated graphical data obtained by eliminating closed paths from the graphical data of FIG. 9 and table data containing values representing the closed-path-eliminated graphical data. In the table data of FIG. 12, value "1" at row A and column C, for example, indicates that a link from a node A to a node C exists. The closed-path eliminating unit 156 stores data having a format as illustrated in FIG. 12 in, for example, the memory 118.

The process or method of eliminating closed paths is not limited to that described above. For example, closed paths may be eliminated by strongly-connected component decomposition.

<Determination of Order>

The order determining unit 158 determines the order of starting or stopping virtual servers of the managed server 200 based on closed-path-eliminated graphical data from which closed paths have been eliminated. Below, an exemplary process of determining the order of stopping virtual servers of the managed server 200 is described. The order of starting the virtual servers may be obtained by reversing the order of stopping the virtual servers.

Figure 13:
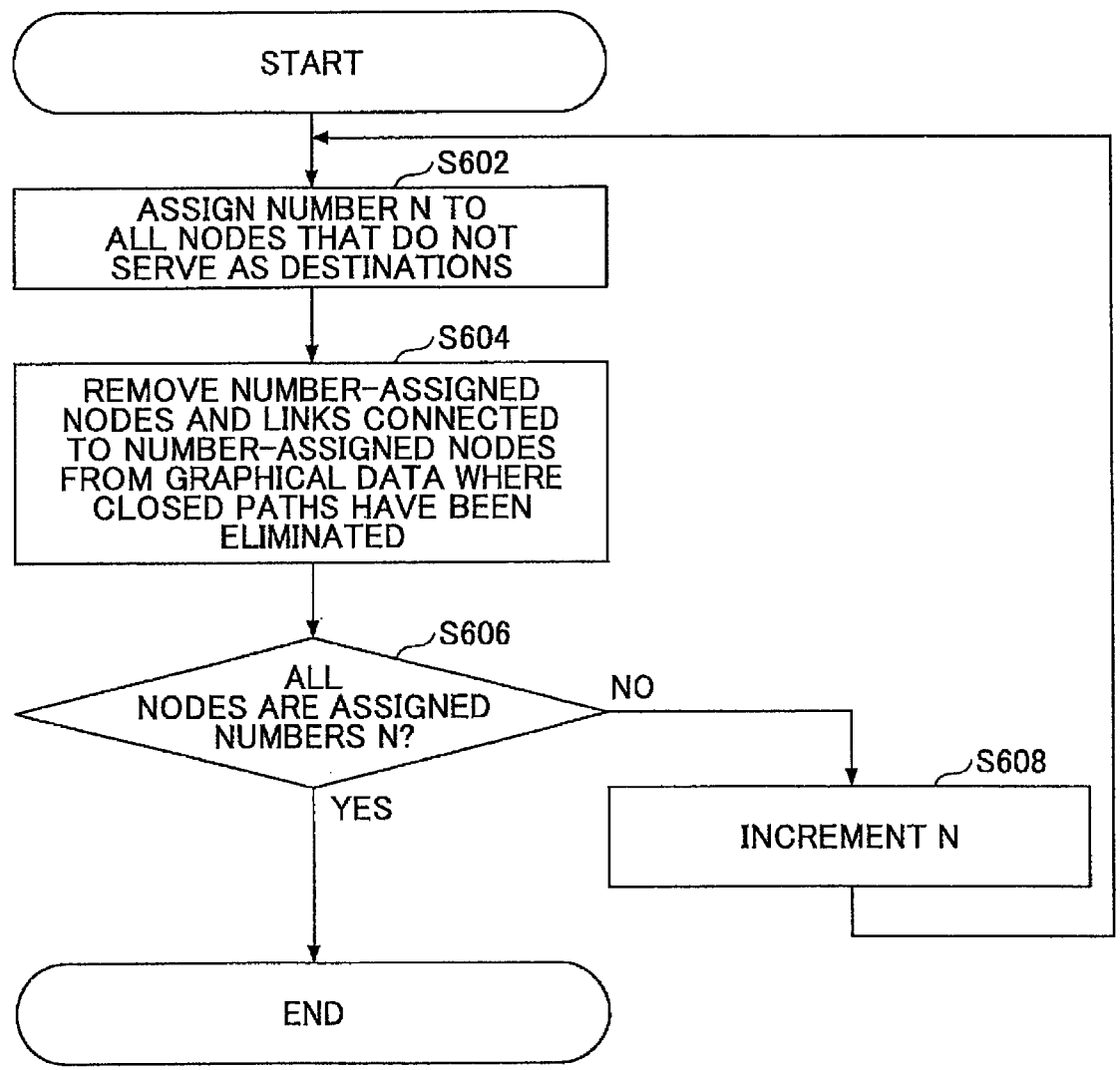
FIG. 13 is a flowchart illustrating an exemplary process performed by an order determining unit.

FIG. 13 is a flowchart illustrating an exemplary process performed by the order determining unit 158.

The order determining unit 158 assigns a number N to all nodes in the closed-path-eliminated graphical data that do not serve as destinations (S602). The nodes to which the number N has been assigned may be referred to as "number-assigned nodes". The number N, for example, starts from an initial value of "1" and is incremented by one. The nodes that do not serve as destinations can be determined by referring to table data as illustrated in FIG. 12. In the example of FIG. 12, those nodes are represented by the labels of columns in the table data where "1" is not stored.

Next, the order determining unit 158 removes the number-assigned nodes and links connected to the number-assigned nodes from the closed-path-eliminated graphical data (S604). Data regarding the removed nodes and links and the assigned number N may be stored, for example, in the memory 118 separately from the closed-path-eliminated graphical data. Also, the order determining unit 158 may be configured to attach "removal" flags to the number-assigned nodes and links connected to the number-assigned nodes and leave data of the number-assigned nodes and the links in the closed-path-eliminated graphical data. In other words, the order determining unit 158 may be configured to "virtually" remove the nodes and links.

Next, the order determining unit 158 determines whether numbers N have been assigned to all nodes in the closed-path-eliminated graphical data (S606). When numbers N have not been assigned to all nodes in the closed-path-eliminated graphical data, the order determining unit 158 increments the number N (S608) and returns to step S602. Meanwhile, when numbers N have been assigned to all nodes in the closed-path-eliminated graphical data, the order determining unit 158 terminates the process.

FIGS. 14 through 22 are drawings illustrating changes made to the closed-path-eliminated graphical data and the table data as the process of FIG. 13 proceeds.

Figure 14:
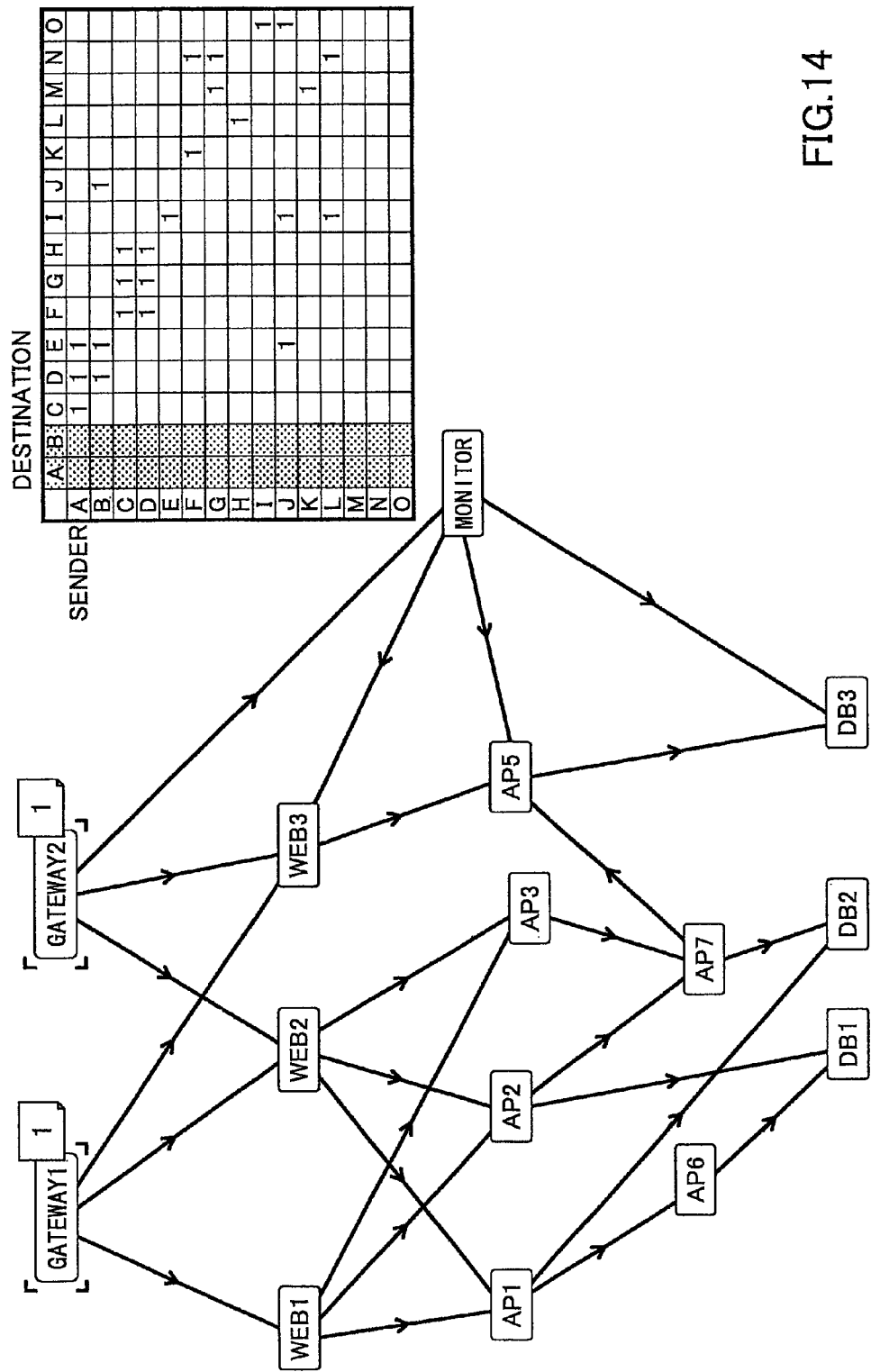
FIG. 14 is a drawing illustrating changes made to graphical data and table data as the process of FIG. 13 proceeds.

In FIG. 14, compared with the closed-path-eliminated graphical data and the table data of FIG. 12, number "1" has been assigned to nodes A and B corresponding to columns A and B of the table data that do not contain value "1".

Figure 15:
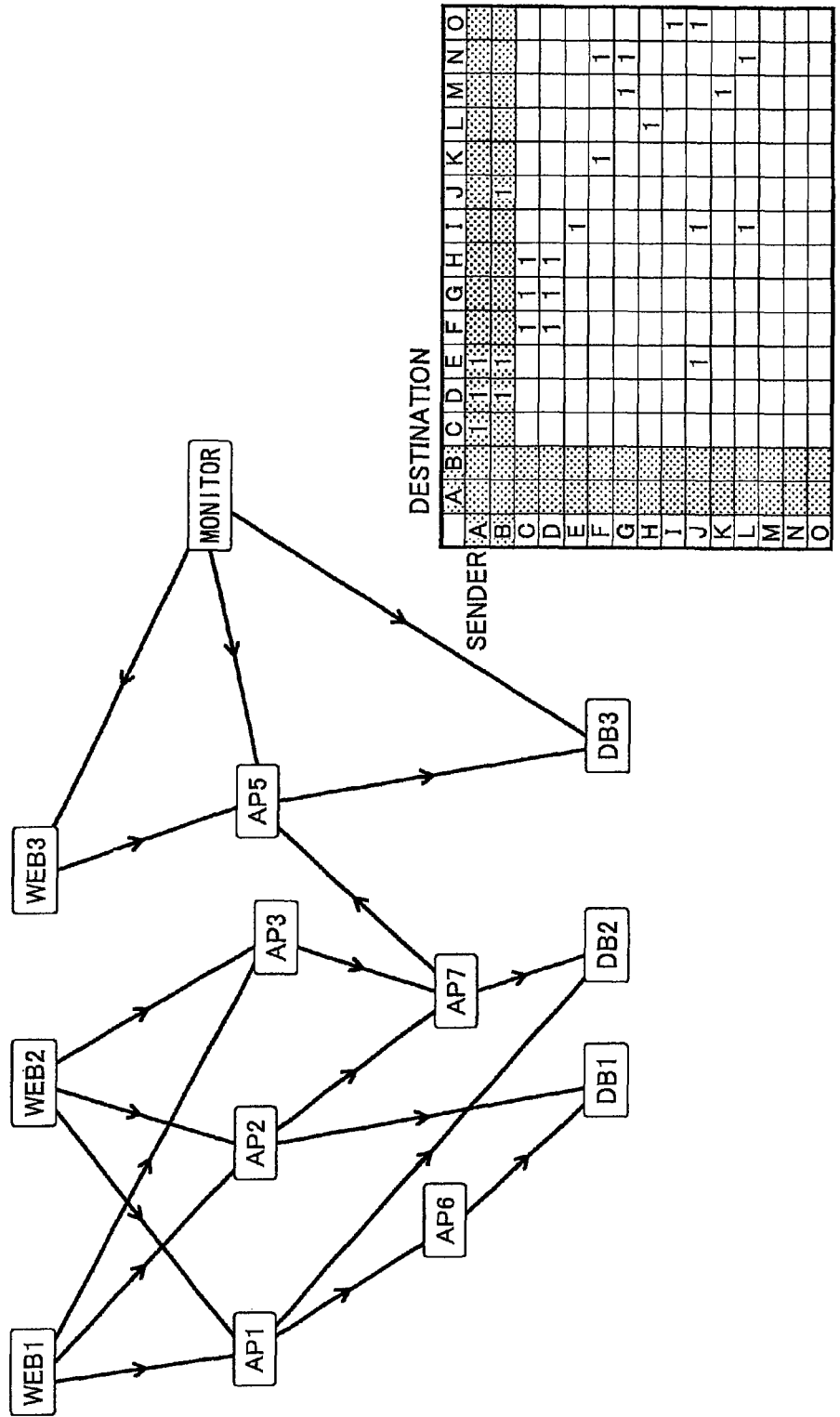
FIG. 15 is a drawing illustrating changes made to graphical data and table data as the process of FIG. 13 proceeds.

In FIG. 15, the nodes A and B and links connected to the nodes A and B have been removed from the closed-path-eliminated graphical data. Also, in the table data, columns and rows corresponding to the removed nodes A and B are masked (indicated by shading) for the subsequent process.

Figure 16:
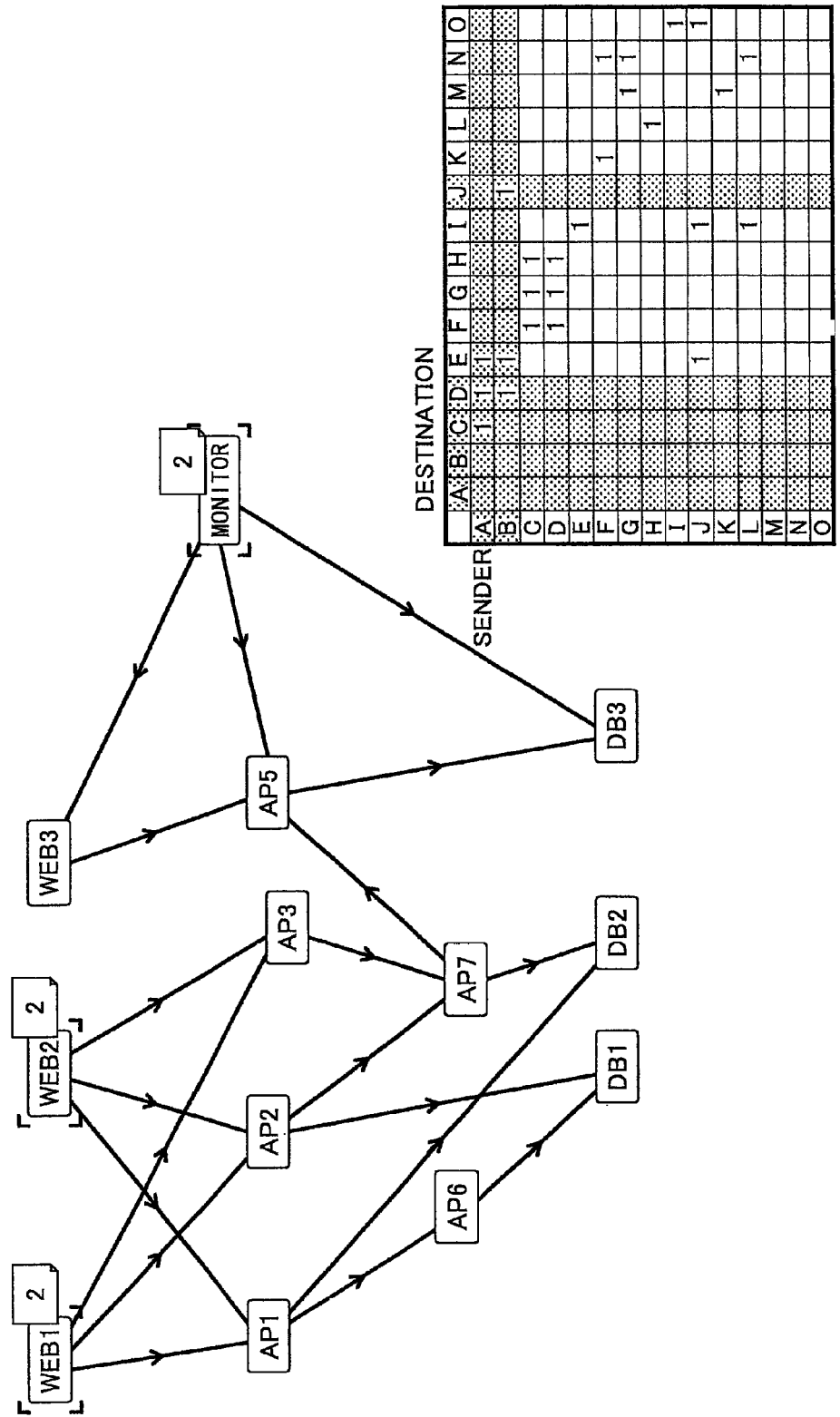
FIG. 16 is a drawing illustrating changes made to graphical data and table data as the process of FIG. 13 proceeds.

In FIG. 16, compared with the closed-path-eliminated graphical data and the table data of FIG. 15, number "2" has been assigned to nodes C, D, and J corresponding to columns C, D, and J that do not contain value "1" in the table data of FIG. 15 where columns and rows corresponding to the removed nodes A and B are masked.

Figure 17:
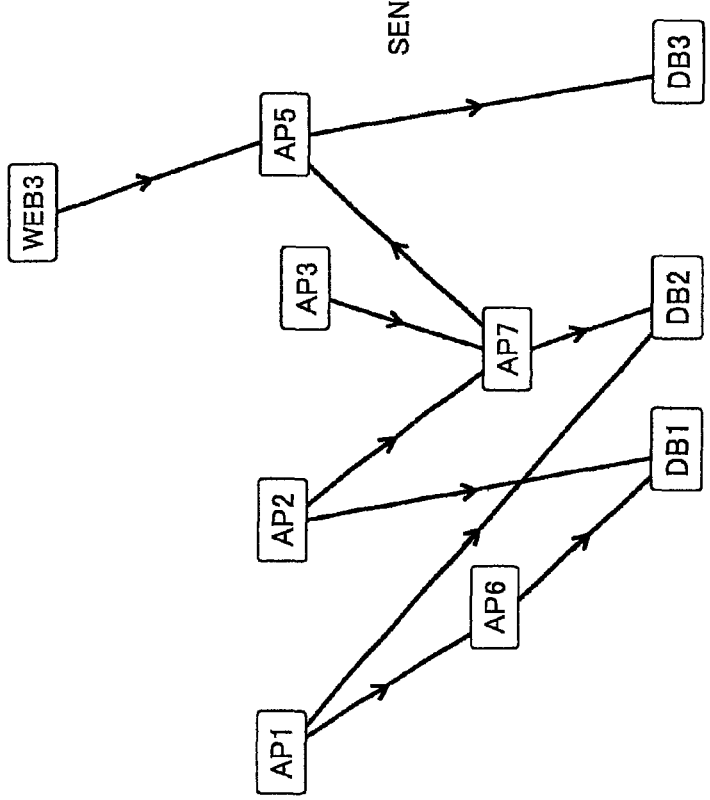
FIG. 17 is a drawing illustrating changes made to graphical data and table data as the process of FIG. 13 proceeds.

In FIG. 17, the nodes C, D, and J and links connected to the nodes C, D, and J have been removed from the closed-path-eliminated graphical data. Also, in the table data, columns and rows corresponding to the removed nodes A, B, C, D, and J are masked for the subsequent process.

Figure 18:
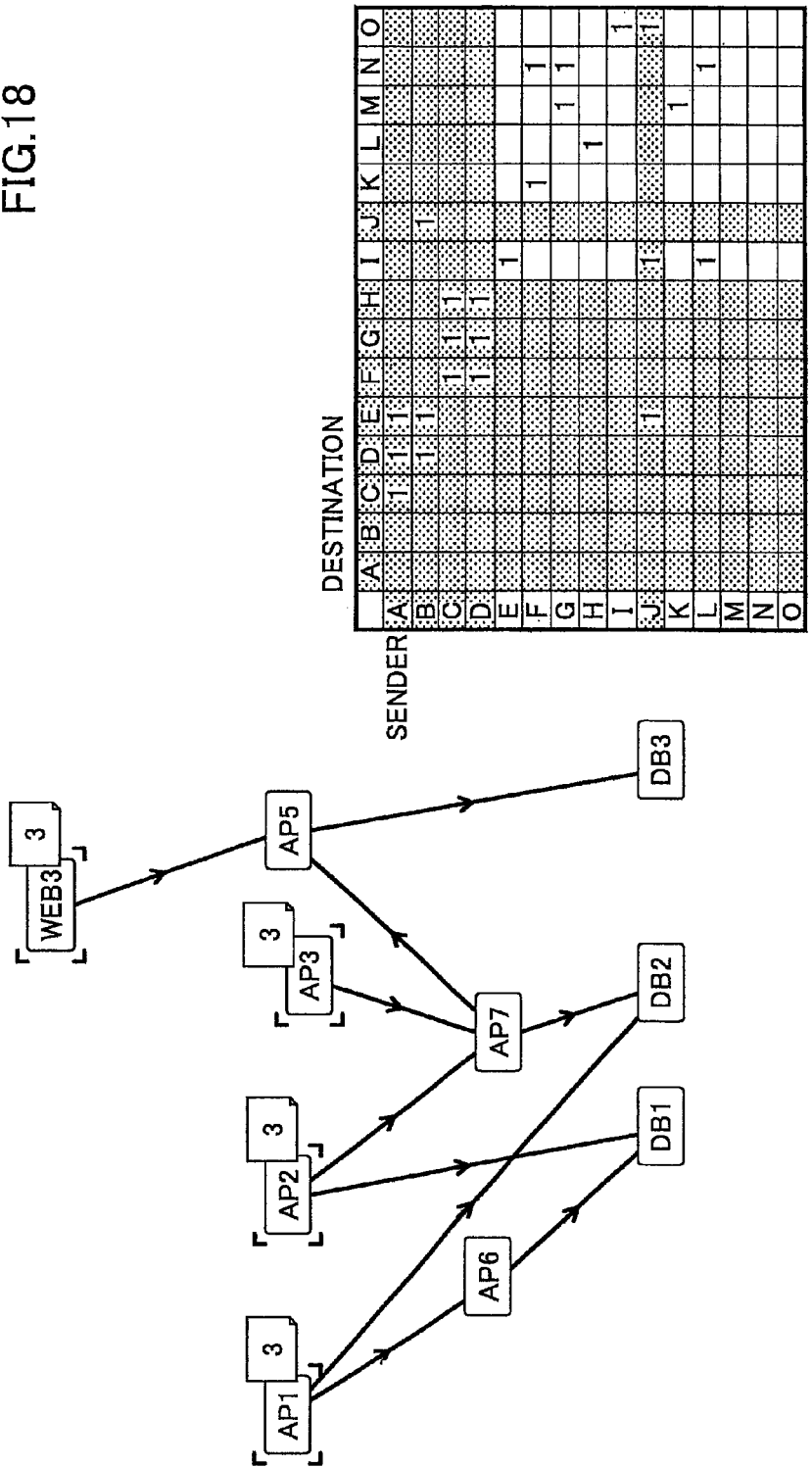
FIG. 18 is a drawing illustrating changes made to graphical data and table data as the process of FIG. 13 proceeds.

In FIG. 18, compared with the closed-path-eliminated graphical data and the table data of FIG. 17, number "3" has been assigned to nodes E, F, G, and H corresponding to columns E, F, G, and H that do not contain value "1" in the table data of FIG. 17 where columns and rows corresponding to the removed nodes A, B, C, D, and J are masked.

Figure 19:
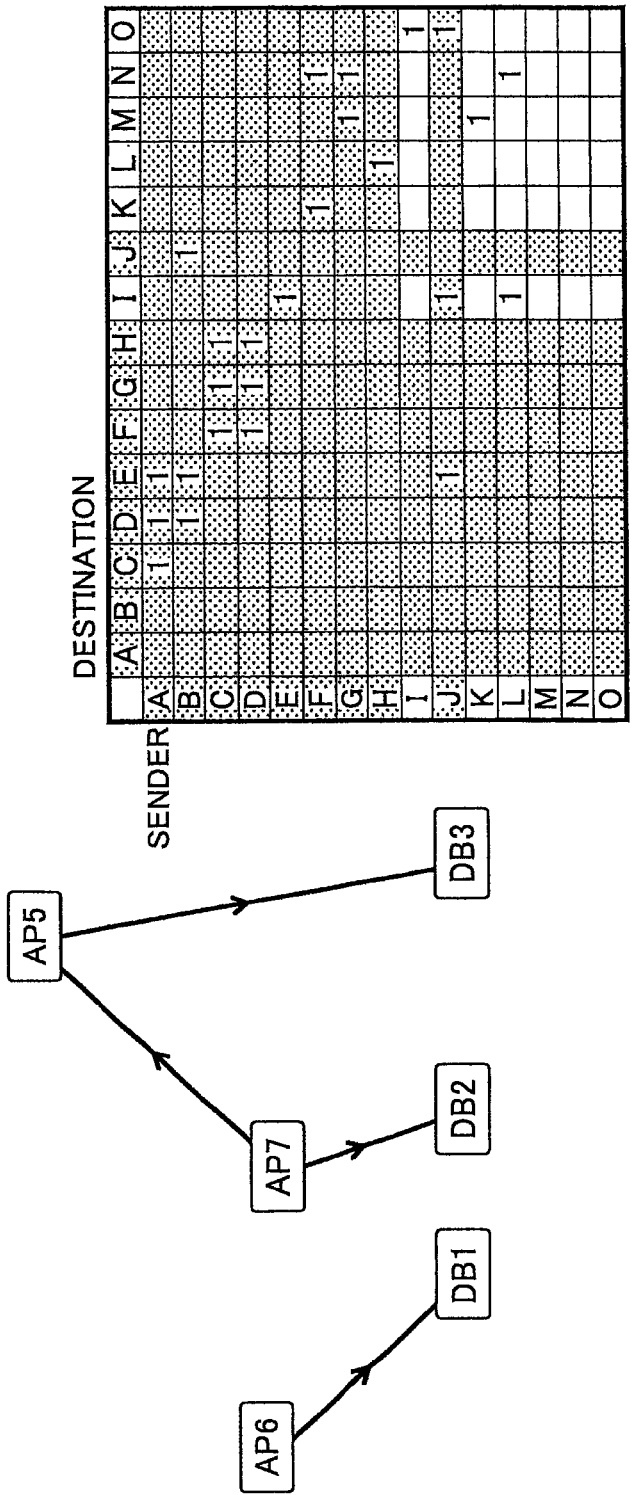
FIG. 19 is a drawing illustrating changes made to graphical data and table data as the process of FIG. 13 proceeds.

In FIG. 19, the nodes E, F, G, and H and links connected to the nodes E, F, G, and H have been removed from the closed-path-eliminated graphical data. Also, in the table data, columns and rows corresponding to the removed nodes A-H and J are masked for the subsequent process.

Figure 20:
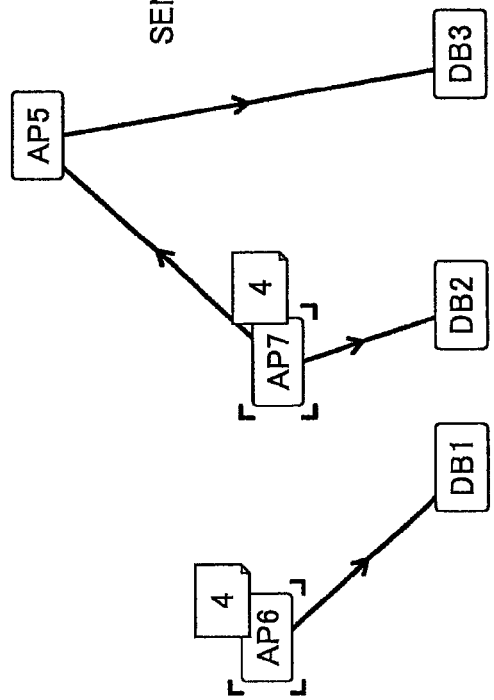
FIG. 20 is a drawing illustrating changes made to graphical data and table data as the process of FIG. 13 proceeds.

In FIG. 20, compared with the closed-path-eliminated graphical data and the table data of FIG. 19, number "4" has been assigned to nodes K and L corresponding to columns K and L that do not contain value "1" in the table data of FIG. 19 where columns and rows corresponding to the removed nodes A-H and J are masked.

Figure 21:
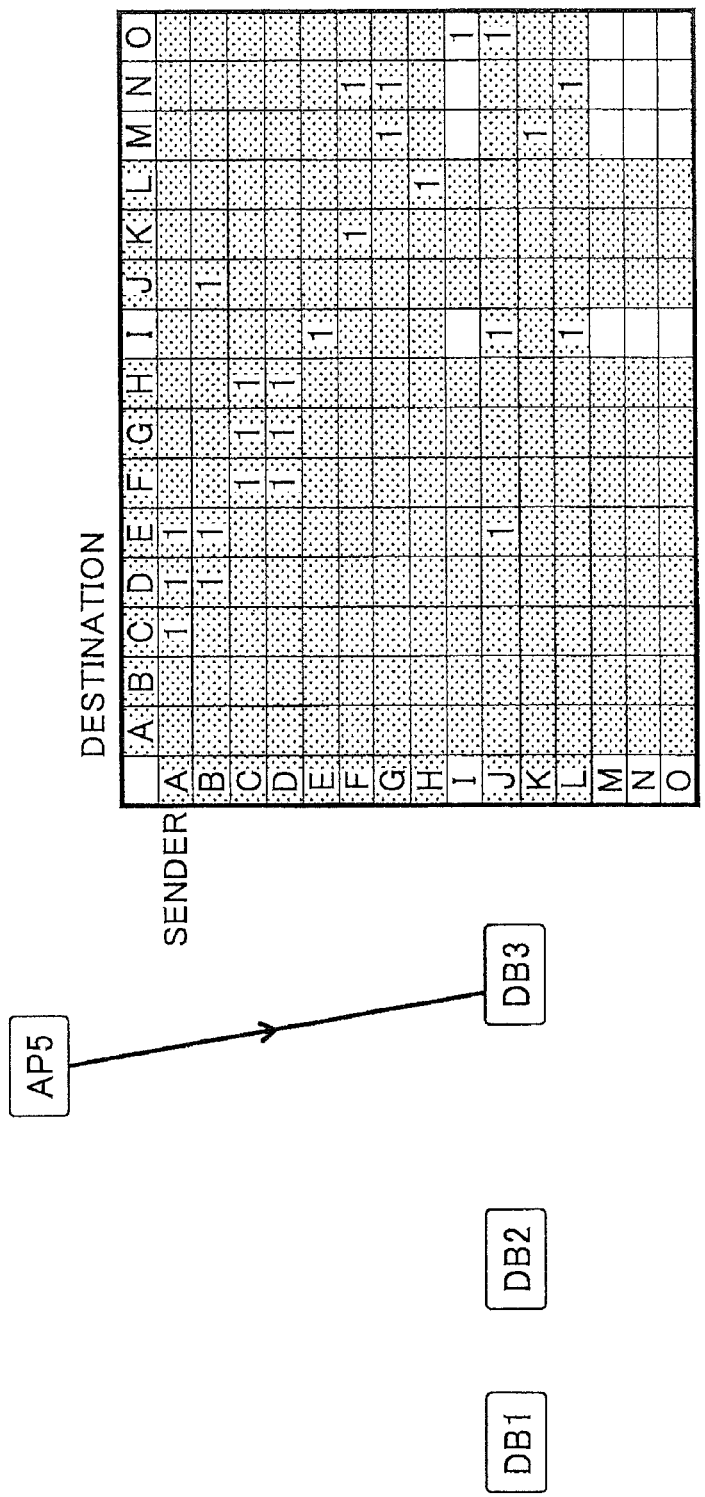
FIG. 21 is a drawing illustrating changes made to graphical data and table data as the process of FIG. 13 proceeds.

In FIG. 21, the nodes K and L and links connected to the nodes K and L have been removed from the closed-path-eliminated graphical data. Also, in the table data, columns and rows corresponding to the removed nodes A-H and J-L are masked for the subsequent process.

Figure 22:
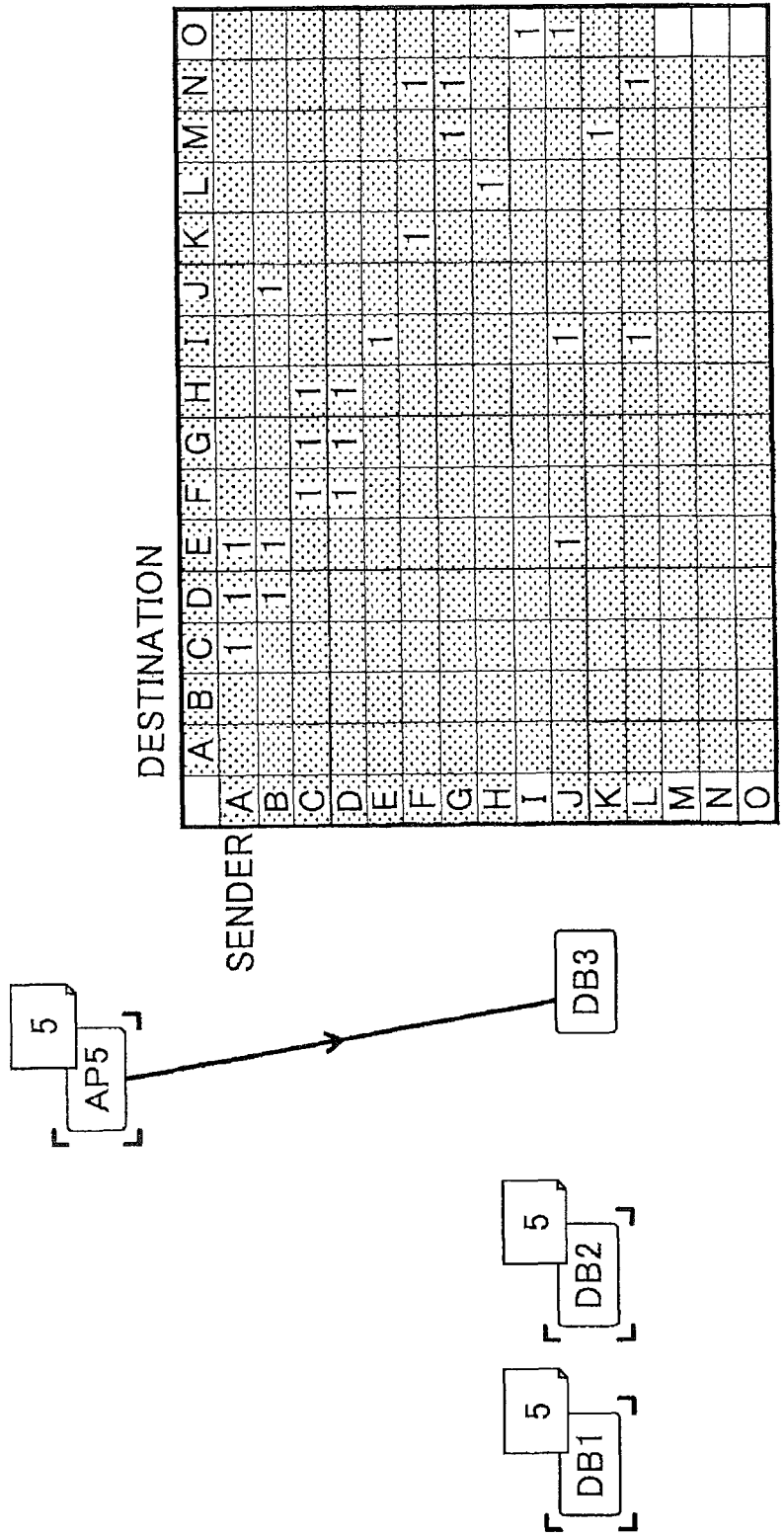
FIG. 22 is a drawing illustrating changes made to graphical data and table data as the process of FIG. 13 proceeds.

In FIG. 22, compared with the closed-path-eliminated graphical data and the table data of FIG. 21, number "5" has been assigned to nodes I, M, and N corresponding to columns I, M, and N that do not contain value "1" in the table data of FIG. 21 where columns and rows corresponding to the removed nodes A-H and J-L are masked.

Finally, number "6" is assigned to the remaining node O.

Figure 23:
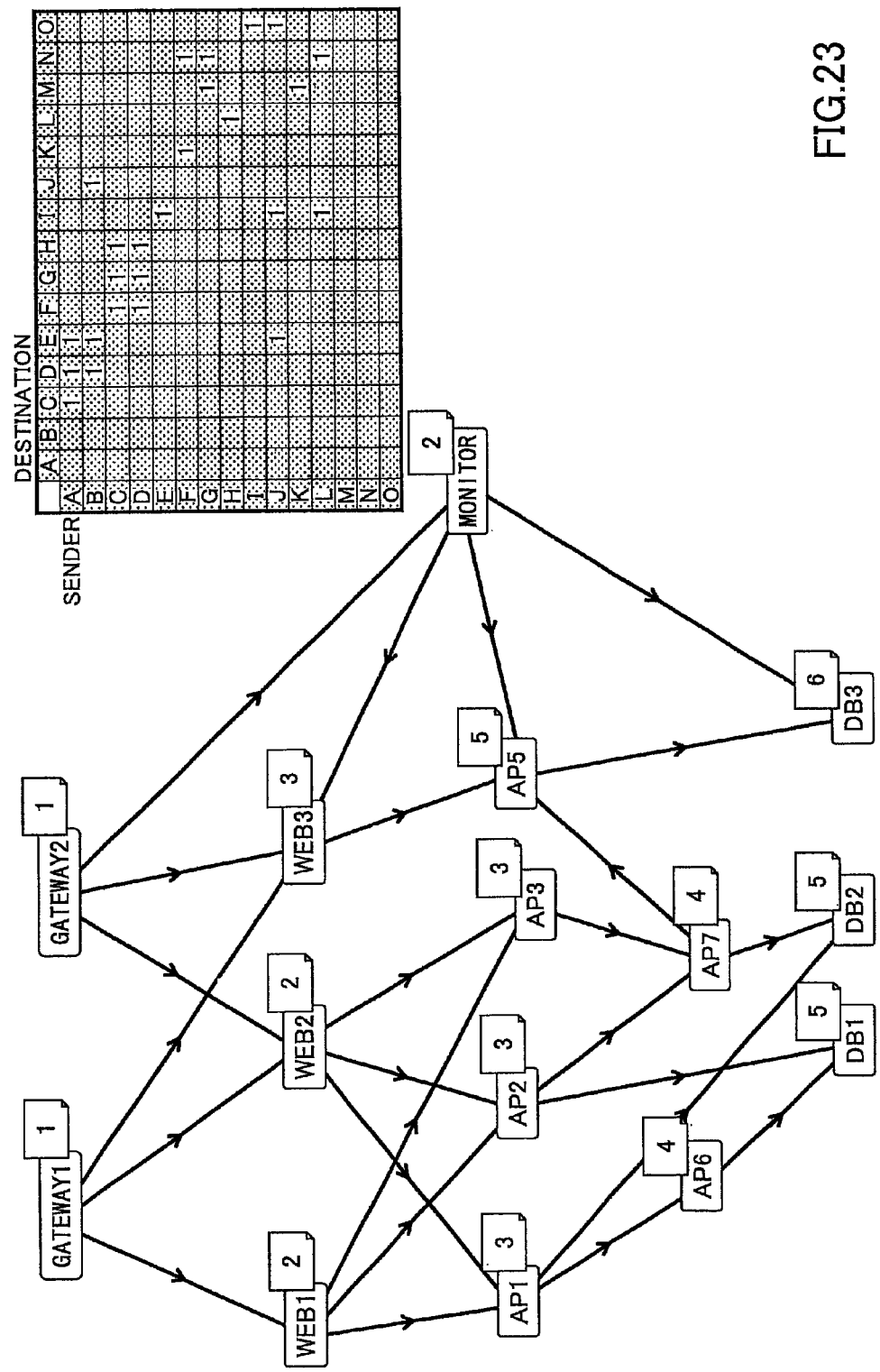
FIG. 23 is a drawing illustrating graphical data where numbers N are assigned to all nodes and table data where all columns and rows corresponding to the nodes are masked.

FIG. 23 is a drawing illustrating graphical data where numbers N are assigned to all nodes and table data where all columns and rows corresponding to the nodes are masked.

Through the above process, an appropriate order for starting or stopping virtual servers can be determined. By starting or stopping virtual servers in the determined order, for example, it is possible to prevent an unexpected error message from being output and prevent started functional components from malfunctioning.

<Starting or Stopping Virtual Servers>

The starting and stopping unit 160 performs a process of starting or stopping the virtual servers of the managed server 200 according to the order determined by the order determining unit 158. When the smallest number is first assigned to nodes that do not serve as destinations and then greater numbers are assigned to the remaining nodes as in the process of FIG. 13, the determined order is used to stop the virtual servers, i.e., the virtual servers are stopped in ascending order of the assigned numbers. In this case, the virtual servers may be started in descending order of the assigned numbers. Meanwhile, when the smallest number is first assigned to nodes that do not serve as senders and then greater numbers are assigned to the remaining nodes, the determined order is used to start the virtual servers, i.e., the virtual servers are started in ascending order of the assigned numbers. In this case, the virtual servers may be stopped in descending order of the assigned numbers.

In a process of starting the virtual servers, the starting and stopping unit 160 confirms that all virtual servers with a current assigned number have been started before starting virtual servers with a next assigned number. Here, since a time lag may exist between the start of an OS and the start of a service, the completion of start-up of virtual servers may be confirmed, for example, by pinging port numbers of the virtual servers.

Meanwhile, in a process of stopping the virtual servers, the starting and stopping unit 160 confirms that all virtual servers with a current assigned number have been stopped before stopping virtual servers with a next assigned number. The completion of shutdown of virtual servers may be confirmed, for example, by using a function of the VM hosts 210 and 250 of the managed server 200.

SUMMARY

As described above, the management server 100 of the present embodiment removes one or more links in graphical data to eliminate closed paths from the graphical data, and starts or stops functional components (virtual servers) based on the graphical data from which the closed paths have been removed. With this configuration, the management server 100 can start or stop multiple functional components of the managed server 200 in an appropriate order even when communication links among the functional components are complex.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A system management apparatus, comprising:
   a memory that stores a program; and
   a processor configured to execute the program stored in the memory to perform a process including
   collecting communication records of communications performed among functional components to be managed, each of the collected communication records includes a local IP address and a local port number of a local functional component, and a foreign IP address and a foreign port number of a functional component communicating with the local functional component;
   extracting communication links between the functional components from the collected communication records;
   removing one or more of the communication links to eliminate closed paths from the communication links; and
   determining an order in which the functional components are started or stopped based on the communication links from which the closed paths have been eliminated, wherein the functional components include virtual servers; and
   the extracting includes determining whether each of the virtual servers is a destination or a sender in the communication records based on a frequency of use of respective port numbers of the virtual servers in the communication records.

2. The system management apparatus as claimed in claim 1, wherein in the removing, a communication link having a lowest communication frequency is removed from the communication links forming each of the closed paths.

3. The system management apparatus as claimed in claim 1, wherein the process further includes starting or stopping the functional components according to the determined order, and
   wherein in the starting and stopping, whether all functional components in a current place in the order have been started or stopped is confirmed before functional components in a next place in the order are started or stopped.

4. The system management apparatus as claimed in claim 1, wherein the communication records include addresses and port numbers of the functional components.

5. The system management apparatus as claimed in claim 1 wherein the process further includes capturing packets sent and received by the functional components; and
   in the collecting, the communication records including addresses and port numbers of the functional components are collected from the captured packets.

6. The system management apparatus as claimed in claim 1, wherein each of the closed paths is a looped communication path that leads from one of the functional components to another one of the functional components and then back to the one of the functional components.

7. A method performed by a system management apparatus, the method comprising:
   collecting communication records of communications performed among functional components to be managed, each of the collected communication records includes a local IP address and a local port number of a local functional component, and a foreign IP address and a foreign port number of a foreign functional component communicating with the local functional component;
   extracting communication links between the functional components from the collected communication records;
   removing one or more of the communication links to eliminate closed paths from the communication links; and
   determining an order in which the functional components are started or stopped based on the communication links from which the closed paths have been eliminated, wherein the functional components include virtual servers; and
   the extracting includes determining whether each of the virtual servers is a destination or a sender in the communication records based on a frequency of use of respective port numbers of the virtual servers in the communication records.

8. The method as claimed in claim 7, wherein in the removing, a communication link having a lowest communication frequency is removed from the communication links forming each of the closed paths.

9. The method as claimed in claim 7, further comprising:
   starting or stopping the functional components according to the determined order, wherein in the starting or stopping, whether all functional components in a current place in the order have been started or stopped is confirmed before functional components in a next place in the order are started or stopped.

10. The method as claimed in claim 7, wherein the communication records include addresses and port numbers of the functional components.

11. A non-transitory computer-readable storage medium storing program code for causing a computer to perform a process, the process comprising:
- collecting communication records of communications performed among functional components to be managed, each of the collected communication records includes a local IP address and a local port number of a local functional component, and a foreign IP address and a foreign port number of a foreign functional component communicating with the local functional component;
- extracting communication links between the functional components from the collected communication records;
- removing one or more of the communication links to eliminate closed paths from the communication links; and
- determining an order in which the functional components are started or stopped based on the communication links from which the closed paths have been eliminated, wherein the functional components include virtual servers; and
- the extracting includes determining whether each of the virtual servers is a destination or a sender in the communication records based on a frequency of use of respective port numbers of the virtual servers in the communication records.

12. The storage medium as claimed in claim 11, wherein in the removing, a communication link having a lowest communication frequency is removed from the communication links forming each of the closed paths.

13. The storage medium as claimed in claim 11, the process further comprising: starting or stopping the functional components according to the determined order, wherein in the starting or stopping, whether all functional components in a current place in the order have been started or stopped is confirmed before functional components in a next place in the order are started or stopped.

14. The storage medium as claimed in claim 11, wherein the communication records include addresses and port numbers of the functional components.

* * * * *